July 7, 1942.　　　　F. S. DENISON　　　　2,288,890
TEMPERATURE CONTROL SYSTEM
Filed June 26, 1937　　　3 Sheets-Sheet 2
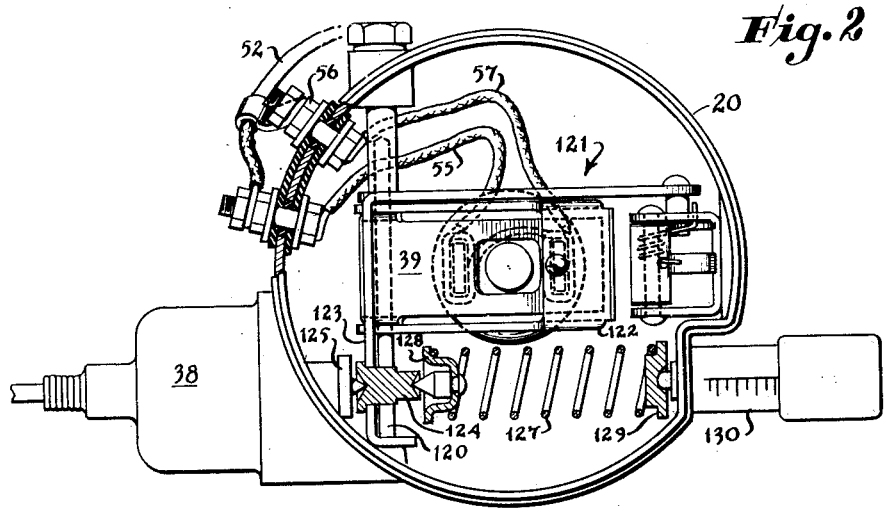
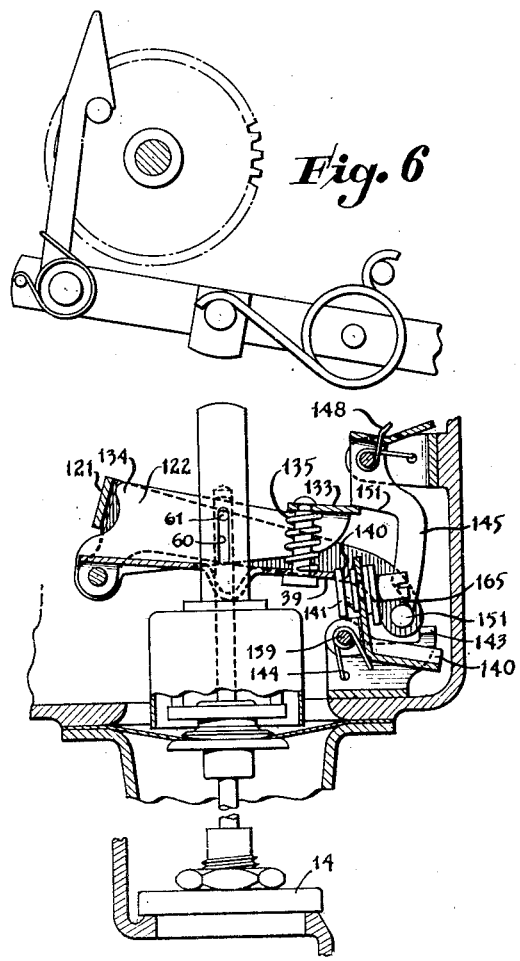
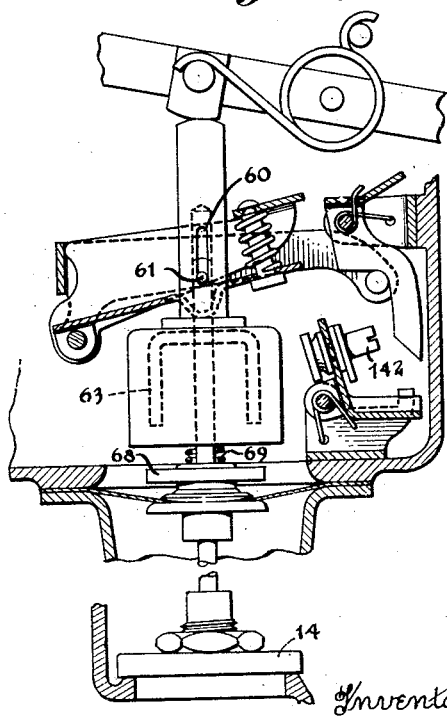
Inventor
*Frederick S. Denison*
By George H. Fisher
Attorney July 7, 1942.　　　　F. S. DENISON　　　　2,288,890
TEMPERATURE CONTROL SYSTEM
Filed June 26, 1937　　　3 Sheets-Sheet 3
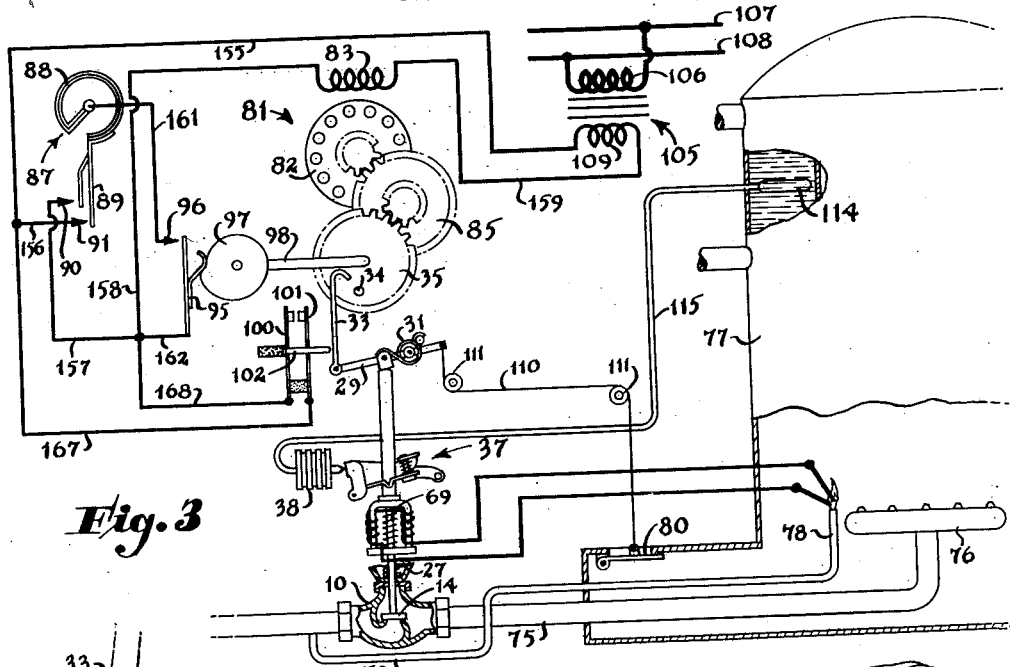
Fig. 3
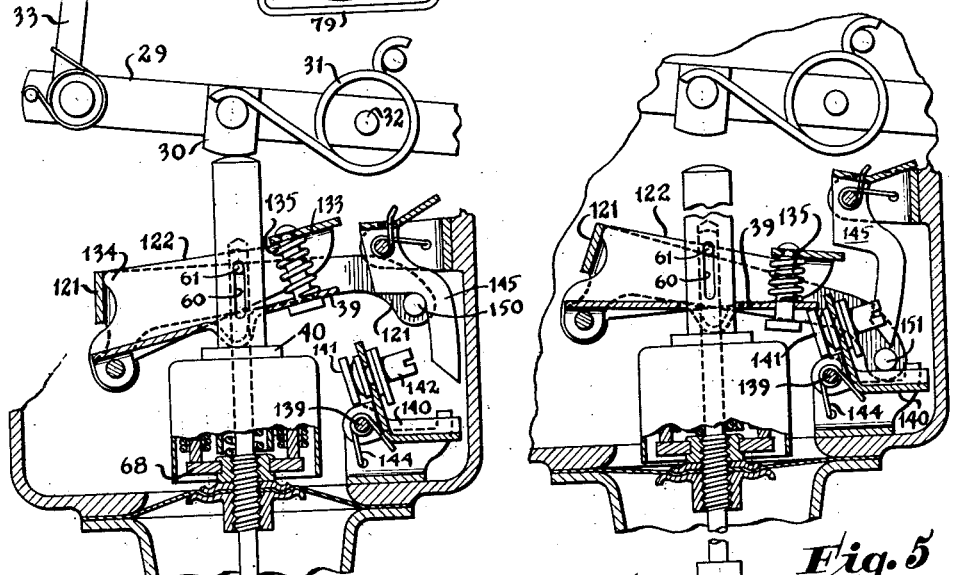
Fig. 4
Fig. 5
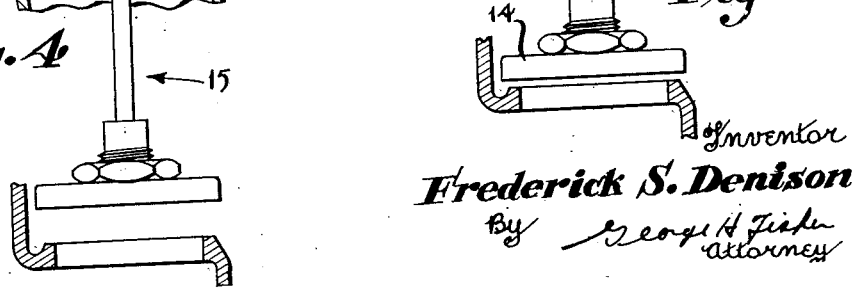
Inventor
Frederick S. Denison
By George H. Fisher
Attorney Patented July 7, 1942

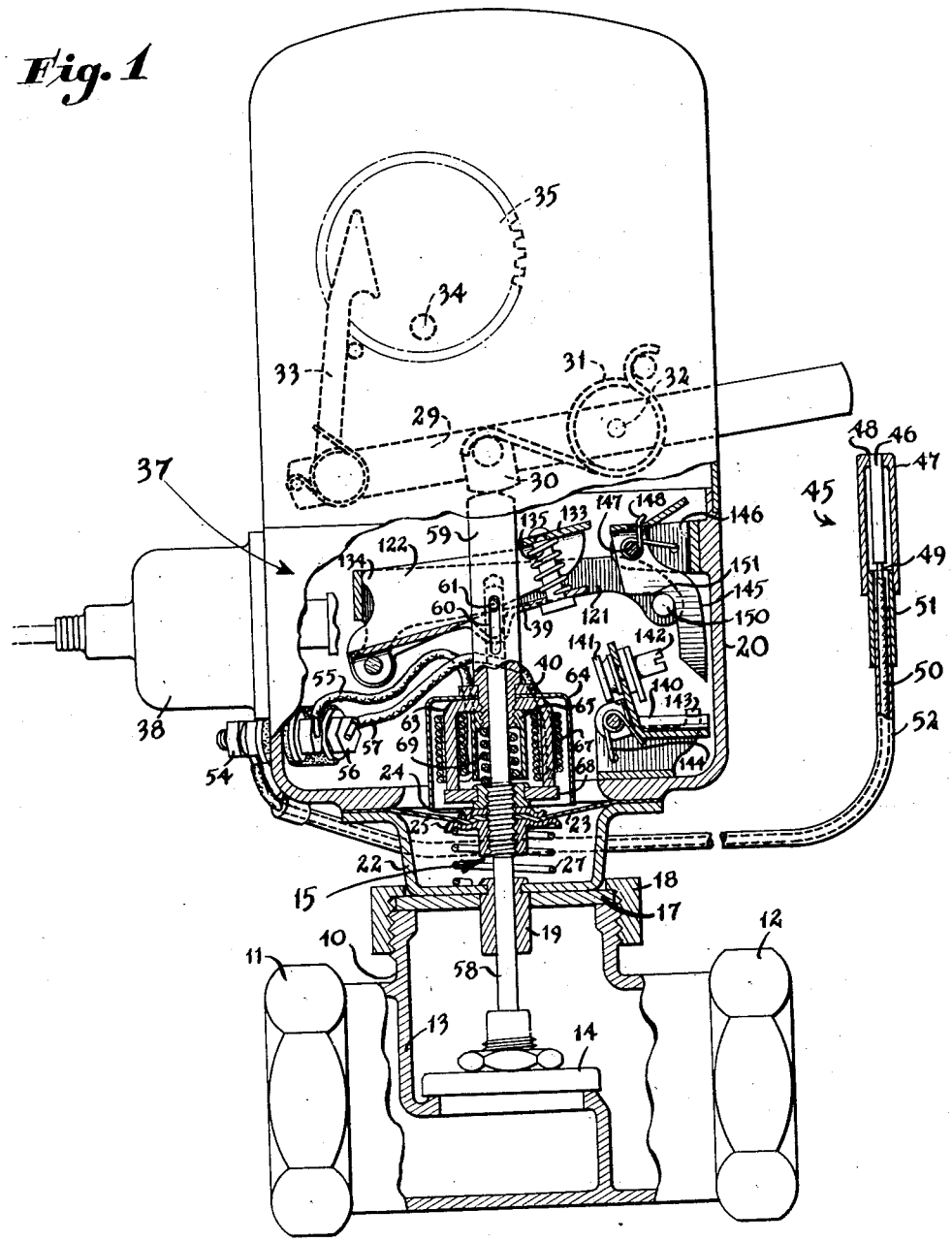

2,288,890

UNITED STATES PATENT OFFICE 2,288,890

TEMPERATURE CONTROL SYSTEM

Frederick S. Denison, Minneapolis, Minn., assignor to Minneapolis-Honeywell Regulator Company, Minneapolis, Minn., a corporation of Delaware Application June 26, 1937, Serial No. 150,575

19 Claims. (Cl. 236—9)

This invention relates to a temperature control system and more particularly to one employing a single controlling device which is actuated in accordance with a plurality of conditions.

It has been proposed in the art of temperature control systems, particularly those employing fluid fuel burners to employ a single valve which is actuated in accordance with several different conditions for controlling the flow of fuel to a temperature changing device. Thus in one type of system, a motor is employed to operate a valve between open and closed positions, the motor being controlled by a thermostatic device responsive to space temperature. In this system the valve has also been operated in accordance with the boiler water temperature or the boiler pressure. Provision has also been made for closing the valve in the event of extinguishment of the pilot burner. The prior art arrangements for accomplishing these various functions have, however, been unsatisfactory for several reasons; in the first place the apparatus employed has usually been unduly bulky; in the second place no provision has been made, particularly where the valve is throttled in accordance with boiler water temperature or steam pressure, to close the valve quickly when it approaches a minimum closed position. This is highly desirable since if a valve is throttled to too low a point, particularly a gas valve, "pop back" in the mixer will occur. A further disadvantage of the prior systems has been that the means for closing the valve in the event of the burner flame being extinguished was not sufficiently positive and rapid. Obviously, it is highly desirable when the burner is extinguished that the flow of gas to the burner be shut off as soon as possible.

An object of the present invention is to provide an arrangement wherein a single valve is controlled by both an actuating means which moves the valve from open to closed position in accordance with room temperature and by an actuating means which modulates the valve in accordance with water temperature or boiler pressure, in which the connection between the last named actuating means and the valve is such that upon continued movement of the actuating means in valve closing direction, the valve is gradually moved towards closed position until a minimum closed position is reached at which time the valve is quickly snapped to full closed position.

A further object of the present invention is to provide a controlling mechanism, wherein a valve or other condition controlling device is moved by several actuators each responsive to a different condition, said mechanism having a breakable connection in the valve stem which breakable connection is controlled by an electromagnet energized by a thermocouple, whose hot junction is located in the pilot flame.

A further object of the present invention is to provide in a structure employing an armature unit and an electromagnet unit energized by a thermocouple for holding a valve open against a biasing means, a connection between one of the units and the valve, and an actuating mechanism acting on the other of the units whereby upon separation of the units, the valve is moved by movement of the actuating mechanism only when the units are held together by subsequent reenergization of the electromagnet.

Other objects of the present invention will be obvious after a consideration of the accompanying specification, claims and drawings.

Referring to the drawings,

Figure 1 is an elevational view partly in section of the valve mechanism of the improved temperature control system, Figure 2 is a plan view with the cover removed and with parts shown in section, Figure 3 is a schematic view of the improved temperature control system, Figure 4 is a view of a portion of the valve mechanism with the valve in its normal open position, Figure 5 is a view of the same portion of the valve mechanism with the valve moved to its minimum closed position by the action of the means for throttling the valve according to boiler water temperature, Figure 6 is a view of the same portion of the valve mechanism in which the valve has been completely closed by the throttling means referred to previously, and Figure 7 is a view of the same portion of the valve mechanism in which the valve has been moved to closed position as a result of the electromagnet becoming deenergized.

Referring to the drawings for a more detailed understanding of the invention, the valve housing is designated by the reference numeral 10. This valve housing is provided with inlet and outlet openings 11 and 12 and the usual transverse partition wall 13 which is apertured to provide a valve seat upon which a valve disc 14 seats. Secured to the valve disc 14 is a valve stem 15. The valve housing 10 is closed at its upper end by a closure plate 17 which is retained in position by a gland nut 18. Extending through the closure plate 17 is a valve guide 19 which is secured to a cup shaped casing member 22. The cup shaped member 22 is secured through any suitable fastening means to the closure plate 17 and supported on this cup shaped member 22 is a housing 20 for the valve operating mechanism. A diaphragm 23 is clamped at its outer periphery between the cup shaped casing 22 and the housing 20. Two flanged collar members 24 and 25 are threadedly secured on the stem 15 and are screwed together so as to clamp the diaphragm 23 between them. The diaphragm 23 functions as a seal-off diaphragm preventing the gas in the valve housing 10 from passing into the motor housing 20.

A biasing spring 27 is interposed between the bottom of cup shaped member 22 and the collar 25. This spring serves to urge valve stem 15 upwardly and consequently valve 14 towards open position. As previously indicated the valve is actuated by several independent actuating devices, each of which is capable of opposing the biasing action of spring 27 to move valve 14 to closed position.

The primary actuating means comprises a lever 29 which is pivoted at 32. Pivotally secured to lever 29 is an abutment member 30 which which abuts against the upper end of stem 15. A spring 31 is associated with lever 29 and serves to bias the same in a counter-clockwise direction. The spring 31 is capable of exerting greater force on the stem 15 than the biasing spring 27. Accordingly, unless the movement of lever 29 is restrained by other means, to be presently described, the spring 31 is effective to overcome the action of the first spring 27 and to maintain the valve 14 in closed position. Means is provided for actuating lever 29 in response to a controlling condition and will be described in a subsequent paragraph. Briefly this means comprises a hook 33 which is pivotally secured to lever 29 and which is adapted to be engaged by pin 34 which projects from a gear 35. The gear 35 is driven by a motor controlled by an arrangement which will be subsequently described.

A second actuating means is generally indicated by the reference numeral 37. In general this actuating means consists of a bellows located within a housing 38 which bellows operates a lever 39 which bears against a collar 40 on valve stem 15. The pressure within the bellows which may itself be referred to by the numeral 38, is determined by some controlling condition and in turn controls the position of lever 39. Lever 39 forms one element of a modulating, snap-action mechanism which upon continued expansion of bellows 38 causes the valve to be gradually moved to closed position until a minimum closed position is obtained and upon further movement of the bellows, the valve 14 is snapped to fully closed position. Similarly upon return movement of the bellows the valve first snaps to a minimum open position and thereafter is moved to a position corresponding to the value of a condition controlling the bellows. This modulating snap-action mechanism will be described in greater detail subsequently.

The third actuating means for the valve is that controlled by a thermo-couple, which in the temperature control system is located so that its hot junction is in the pilot flame. The thermo-couple is indicated in the drawings by the reference numeral 44. This thermo-couple comprises the usual elements 46 and 47 of different thermo-electric characteristics which are joined at 48 to provide the "hot junction" of the thermo-couple. While the metals employed for elements 46 and 47 may be any metals having suitable dissimilar thermo-electric characteristics, it has been found desirable to employ an inner member of "Constantan," an alloy comprising approximately fifty percent nickel and fifty percent copper, and an outer member 47 of stainless steel. The stainless steel employed may be any suitable stainless steel capable of adequately resisting the heat of the pilot burner flame, where the device is intended to be employed in connection with a pilot burner.

The inner member 46 is connected to a conductor 49 which is suitably insulated as at 50. The outer member 47 is connected to a copper reducing sleeve 51, which in turn is connected to a copper tube 52 surrounding the insulated conductor 49. The inner conductor 49 is connected through a lead-in terminal 54 to a conductor 55 within the motor housing 20 as best shown in Figure 2. The copper tube 52 which functions as the other conductor connected to the thermo-couple is connected through a second lead-in terminal 56 to a conductor 57 also in the housing 20.

Thermo-couple 45 energizes an electromagnet which serves to hold two portions of the valve stem together so long as the thermo-couple is heated. The valve stem is generally designated by the reference numeral 15 and actually consists of two relatively movable portions. The lower portion is indicated by the reference numeral 58 and is rod-like in shape. The upper portion is indicated by the reference numeral 59 and is hollow for a portion of its length to receive the upper end of member 58, so that the two members are telescoped with respect to each other. The upper member 59 is slotted as at 60 and a pin 61 secured to the member 58 projects through this slot. The pin 61 serves to limit the relative movement of members 58 and 59. Secured to the upper member 59 is a U-shaped core member 63 of an electromagnet. Surrounding this core member 63 is a cup shaped housing member 64. The lower end of the stem portion 59 is threaded and a cup shaped nut 65 serves to clamp the electromagnet core 63 and the housing member 64 against the collar 40. Wound around the core 63 is a winding 67, and ends of which are connected to conductors 55 and 57 and consequently to the terminals of the thermocouple. An armature 68 is threadedly secured to the lower portion 58 of the valve stem 15. A spring 69 is located in a recessed portion of the nut 65 and serves to urge the core 63 and the armature 68 apart. The spring 69 is capable of exerting greater force than the spring 27 so that so long as the collar 63 and armature 68 of the electromagnet are not otherwise held together, the spring 69 is effective to move valve 14 to closed position.

The armature and core of the electromagnet are preferably of "Permalloy" or some other suitable material of very high permeability. The conductor 49, the tubing 52, the conductors 55 and 57, and the winding 67 are all of relatively large cross-section so that their resistance is very small. By reason of the low resistance and the high permeability of the magnetic members of the electromagnet, the relatively small electromotive force generated by the thermo-couple is capable of exerting through the magnet a sufficient magnetic force to hold the core 63 and the armature 68 together against the action of spring 69 when these members are moved into engagement with each other. It will thus be seen that so long as the thermo-couple is heated the valve stem 15 functions as a unitary member. As soon however as the thermo-couple is allowed to cool off sufficiently, a spring 69 is effective to move core 63 and armature 68 of the electromagnet apart causing the portions 58 and 59 of the valve stem 15 to likewise move apart and consequently extend the length of the valve stem, thus closing the valve.

Reference is now made to Figure 3 wherein the valve mechanism which has been briefly described in the foregoing paragraphs is shown as embodied in a temperature control system. The valve is shown in this figure as controlling the flow of gas through a gas line 75 leading to a gas burner 76. The gas burner forms the heating element of a boiler 77, which for purposes of illustration is shown as a hot water boiler. Located adjacent to the burner 76 is a pilot burner 78 which is supplied with gas through a pipe line 79 leading to the gas line 75 ahead of the valve 14. A damper 80 is pivotally secured to the interior of the furnace casing so as to be biased to an open position. This damper 80 is employed to control the secondary air supplied to burner 76.

As previously indicated, a lever 29 which is biased in a counter-clockwise position by spring 31 is actuated by a motor which in turn is controlled by a thermostat. This motor is generally indicated by the reference numeral 81 and is shown as comprising a rotor 82 and a field winding 83. The rotor 82 is connected to a reduction gear train indicated by the reference numeral 85 to the gear 35 previously referred to. The operation of the motor 81 is controlled by a room thermostat generally indicated by reference numeral 87. This room thermostat comprises a bimetallic element 88 having secured thereto a contact arm 89 adapted to cooperate with contacts 90 and 91 respectively. Contact 90 is more widely spaced from contact arm 89 than contact 91 so that upon movement of contact arm 89 to the left it engages first contact 91 and upon continued movement, the contact 90. The bimetallic element 88 is so arranged that this movement of contact arm 89 takes place upon a decrease in temperature. Also controlling the energization of motor 83, is a maintaining switch comprising a switch blade 95 adapted to cooperate with a contact 96. The switch blade 95 is operated by a cam 97 which is in turn operatively connected through a shaft 98 through gear 35. The cam 97 is effective upon initial movement of gear 35 in clockwise direction, which is the movement it assumes during valve opening position, to move switch arm 95 into engagement with contact 96. The function of this switch will be explained in greater detail in a subsequent portion of this specification. A recycling switch is also provided for controlling the operation of motor 81 under certain circumstances. This cycling switch comprises two switch blades 100 and 101. Cooperating with these switch blades is pin member 102, the end of which is adapted to be moved under the lever 29 when the same is in substantially valve open position. If the pin 102 is so moved inwardly, switch blades 100 and 101 are moved into contact making engagement. The plunger 102 is used only in the event of a power failure. The power for operation of this system is supplied by a step-down transformer 105. This transformer consists of a primary 106 connected to line wires 107 and 108 leading to a suitable source of power (not shown) and a low voltage secondary 109.

The lever 29 has one end connected through a chain 110 or similar device and pulleys 111 to the secondary air damper 80. It will readily be seen that upon movement of lever 29 in a clockwise direction which is the movement assumed during the opening of the valve, the secondary air damper 80 is free to move to open position.

As previously indicated, the bellows 38 is controlled in accordance with the temperature of a controlling condition and is employed to vary the position of valve 14 in accordance with the value of said condition. For purposes of illustration this condition is the temperature of the hot water within the boiler. A bulb 114 is shown as extending into the water jacket of the boiler. This bulb 114 is connected through capillary tube 115 to the bellows 38, which, as previously explained, operates through a linkage mechanism which causes valve 14 to be moved to closed position. This mechanism may be of any suitable form which is capable of imparting a modulated and snap movement to the valve. The form shown for purposes of illustration is that forming the basis of the copending application of Hugh Kelly, Serial No. 41,097, filed September 18, 1935. The structure of this linkage mechanism will be explained at the present time.

Referring to Figure 2, it will be noted that a pin 120 extends through the interior of the housing 20. Pivotally mounted on this pin 120 are the lever 39 previously referred to and levers 121 and 122. As previously stated, the lever 39 bears against the collar 40 secured to valve stem 15. The lever 121 is indicated as being generally L-shaped. The base portion 123, is journaled on the pin 120. Located in one portion of this base portion 123 is a plug 124 having conical recesses at each end thereof. The bellows 38 has secured thereto a pin 125 which has a conical end extending into one of the conical recesses of the plug 124. This pin 125 is actuated in accordance with the movement of bellows 38 and serves to transmit the force exerted by bellows 38 to the plug 124 and consequently to lever 121. Opposing the action of bellows 38 is a spring 127. This spring bears at one end against a spring retainer 128 having a conical portion entering the other conical recess of plug 124. At its other end, spring 127 engages a second spring retainer 129, the position of which is adjusted by a spring adjusting means 130. It will readily be seen that the force exerted by lever 121 is the resultant of the opposing forces exerted by bellows 38 and spring 127. By the action of the adjusting means 130, this resultant force can be varied for any particular temperature so as to vary the temperature setting of the bellows.

The second lever 122, as indicated in Figure 2, is U-shaped in form. The legs of this U-shaped lever extend generally vertically whereas the base portion 133 is horizontally disposed as indicated in Figures 1, 5 and 6. The legs of the lever 122 are provided with projecting portions 134 which are adapted to be engaged by the base portion of lever 121. Accordingly, any movement imparted to the lever 121 in a clockwise direction results in corresponding movement being imparted to lever 122.

A spring 135 is interposed between the horizontal portion 133 of lever 122 and lever 39. This spring 135 serves to form a strain release connection between levers 122 and 39. The spring 135 is moreover stronger than the spring 27 so that unless the movement of the lever 39 is otherwise impeded, the movement of lever 122 in a clockwise direction is effective to cause movement of the valve 14 towards closed position against the biasing action of spring 27.

In order to temporarily retard the movement of valve 14 in valve closing direction, a catch 140 is provided. This catch is pivoted at 139 and has two legs extending at an angle of slightly greater than 90° with respect to each other. Secured to the upwardly extending leg is a cam shaped stop 141. The position of this cam 141 may be adjusted by a screw 142 in a manner more fully explained in the application of Hugh Kelly referred to above. A spring 144 serves to bias the latch member 140 in a counter-clockwise direction, the counter-clockwise movement being limited by a stop 143 which engages the horizontally extending arm of the same. The cam shaped stop 141 is adapted to engage lever 39.

A second catch 145 is provided for retarding the upward movement of lever 122 during opening movement of the valve. This catch is in the form of a lever which is pivotally secured to a supporting bracket 146 at 147. A spring 148 serves to bias the catch 145 in a clockwise direction, the clockwise movement being limited by a pin 150 carried by the forward end of lever 121. This pin 150 serves as a tripping pin, serving at various times in the operation to trip both the catch 140 and the catch 145. The catch 145 is provided with a shoulder portion 151 which engages the horizontal portion 133 of lever 122 during a certain portion of the operation to limit the opening movement of the valve as will be explained in more detail later.

Operation

The various elements of the system are shown in Figure 3 in the position which they assume when the room temperature is above the desired value, when the boiler water temperature is comparatively low, and when the pilot flame is properly ignited. The various elements of the valve mechanism are shown in the position indicated in Figure 1. In this position, the valve is closed and by reason of the core and armature of the electromagnet being retained together the stem 15 functions as though it were a unitary member. Moreover the gear 55 is rotated to a position where the pin 34 does not engage the hook 33.

Let it be assumed that the space temperature decreases. As previously explained, this causes a movement to the left of the contact arm 89 of thermostat 87 so that it first engages contact 91 and then contact 90. As soon as the arm has engaged both contacts, the following energizing circuit is established to the motor field winding 83: From the left hand terminal of secondary 109 through conductors 155 and 156, contact 91, contact arm 89, contact 90, conductor 157, conductor 158, motor field winding 83, and conductor 159 to the other terminal of secondary 109. The establishment of this energizing circuit causes the motor to rotate and causes a clockwise rotation of the gear 35. Initial clockwise rotation of gear 35 is effective through cam 97 to cause engagement of switch blade 95 with contact 96. As soon as this takes place, the following holding circuit is established to the motor field winding 83: From the left hand terminal of secondary 109 through conductors 155 and 156, contact 91, contact arm 89, bimetal element 88, conductor 161, contact 96, switch arm 95, conductors 162 and 158, motor field winding 83, and conductor 159 to the other terminal of secondary 109. It will be noted that the circuit just traced is independent of the engagement of the contact arm 89 with contact 90. Accordingly the motor is not again deenergized until the contact arm 89 has separated from contact 91, which occurs at a higher temperature than that at which the engagement of contact 89 and contact 90 was effected to initiate energization of the motor.

The clockwise rotation of gear 35 caused by the energization of motor 81 is effective to cause pin 34 to engage hook 33. This results in hook 33 being raised upwardly causing the clockwise movement of lever 29 in opposition to spring 31. Spring 27 is thereupon free to move valve 14 upwardly so that valve 14 is moved to open position. Under these conditions the various elements of the valve mechanism occupy the position shown in Figure 4.

With the valve 14 in open position, gas is permitted to flow to burner 76, being ignited by the pilot burner 78. The operation of the burner causes the water in the boiler to be heated up. As the temperature of the water rises, bellows 38 is expanded, which as previously explained, causes the valve 14 to be moved towards closed position. This action will be more fully understood by reference to Figures 4, 5, and 6. It will be noted that upon the valve stem 15 being moved to open position the collar 40 engages the lever 39. As the force exerted by the bellows increases, the lever 121 is rotated in a clockwise direction. This movement of lever 121, by reason of the engagement of the projecting portions 134 of the lever 122 therewith, causes a similar clockwise movement of lever 122. This movement of lever 122 acts through the strain release spring 135 to also move lever 39 in a clockwise direction. Since spring 135 is considerably stronger than spring 27 the valve 14 is moved towards closed position in spite of the biasing action of spring 27. As the bellows continues to expand the various levers continue to rotate in a clockwise direction, as described, until lever 39 engages the cam shaped stop 141 as indicated in Figure 5. As soon as this takes place, further downward movement of lever 39 is temporarily prevented. Clockwise rotation of levers 121 and 122 is however still permitted, due to the spring 135 which is compressed by such further movement of levers 121 and 122. The compression of spring 135 is indicated in Figure 5. The continued movement of lever 121 has as its effect, the bringing of tripping pin 151 into engagement with the horizontally extending arm of catch 140. Any further movement of the lever 121 serves to cause the tripping pin 151 to rotate the catch 140 in a clockwise direction against the action of its biasing spring 142 so that the cam shaped stop 141 is moved out from underneath the lever 39. As soon as this takes place lever 39 is free to move downwardly and by reason of the fact that spring 135 is highly compressed lever 39 is moved down extremely rapidly to quickly close the valve. In the fully closed position the parts assume the relative positions shown in Figure 6. It will be noted from this figure that the catch 140 has just been tripped permitting the lever 39 to move past the cam shaped stop 140.

The action which has just been described is that which takes place when the boiler water becomes heated excessively. It is to be understood that under normal circumstances the valve 14 is not usually moved to fully closed position by reason of the increase in temperature of the boiler water. The usual action is that the valve 15 is gradually throttled in accordance with the hot water temperature so as to gradually reduce the gas flow as the temperature rises. Under ideal conditions, the burner is operated at a capacity just sufficient to keep the space adequately heated.

Turning back to the conditions previously discussed under which the valve 14 has been fully closed as a result of the hot water temperature rising excessively, the interruption of the gas flow will inevitably cause the water temperature to decrease. As this water temperature decreases, the bellows 38 gradually contracts permitting arm 121 to be rotated in a counter-clockwise direction by the action of spring 127. This initial counter-clockwise movement of lever 121 does not however result in the valve 14 being moved from its seat since the spring 135 is merely extended before the horizontal portion 133 of lever 122 engages the shoulder portion 151 of the catch 145 as indicated in Figure 6, so that further upward movement of lever 122 is prevented. Due to the presence of spring 135, the lever 39 is also prevented from moving upwardly. As the bellows continues to contract, spring 127 is effective to cause continued counter-clockwise movement of lever 121. As indicated in Figure 6 the lower end of the catch 145 is provided with a sloping edge 165. As lever 121 continues to move in a counter-clockwise direction, the pin 151 engages this sloping edge 165 and causes catch 145 to be moved in a counter-clockwise direction against the action of its biasing spring 148. When this movement has continued sufficiently far, the shoulder portion 151 passes over the edge of the horizontal base portion 133 of lever 122 releasing this lever. Spring 27 is then effective to move the valve 14 upwardly quickly until projecting portions 134 of lever 122 engage the lever 121 and after this the position assumed by the valve 14 corresponds to the position of lever 121.

It will be noted in the foregoing description that in closing the valve as a result of the water temperature rising the valve is moved slowly to a partially closed position and thereafter moved quickly to full closed position. Again in opening the valve it was moved quickly to a partially closed position and thereafter moved slowly to the desired position. The purpose of providing the snap movement in both opening and closing is that it is impossible to successfully operate a gas burner with less than a certain minimum amount of fuel. If an attempt is made to operate a gas burner with less than the minimum amount of fuel the flame will pop-back into the mixing chamber. As pointed out more fully in the above referred to Kelley application, the present snap action mechanism is particularly desirable in that separate catches are provided for determining the minimum opened positions and the minimum closed positions. It is usually possible in closing a valve to move it to a much more nearly full closed position than it can be moved in opening. In other words, once having established combustion it is possible to throttle the gas flow down to a lower point than it is possible to start it from. By reason of the cam shaped stop 141 it is possible to adjust the minimum closed position independently of the minimum open position.

Under normal circumstances the heating of the water by the operation of the gas burner, even though the heating of the water is gradually reduced by reason of the increase in the water temperature, will eventually result in the temperature of the space being heated rising above the desired value. As soon as this takes place, the contact arm 89 is separated from contact arm 91 thus breaking both the holding and energizing circuits for the motor. This permits spring 31 to rotate the lever 29 in a counter-clockwise direction against the action of biasing spring 27 and force valve 14 to its seat.

If, at any time, the pilot burner becomes extinguished, the thermo-couple unit is rapidly cooled and valve 14 is thereafter immediately closed, if not already so. If for example the valve is opened so that the parts occupy the position shown in Figure 4, when such extinguishment of the pilot takes place, the spring 69 will be immediately effective to urge the armature 68 and the core 63 apart. As indicated previously, the spring 69 is sufficiently stiffer than spring 27 so that valve 14 is urged to its seat in spite of the biasing action of spring 27. If, on the other hand, the extinguishment of the pilot occurs when the valve is closed as in Figure 1, the valve stem 15 is free to extend so that upon upward movement of lever 29 as a result of the subsequent energization of the motor the upper portion 59 of valve stem 15 merely travels upwardly while portion 58 remains in its valve closed position.

If the pilot is extinguished when the room thermostat is calling for the valve to be opened as explained in the above paragraph, it is a relatively simple matter to effect the reconnection of the two elements of the magnet. All that is necessary to do is to first light the pilot burner and to then go upstairs and change the setting of the thermostat first downwardly so that the thermostat is satisfied and then back to its original position. As soon as the thermostat has been adjusted downwardly so that it becomes satisfied, the motor 81 is deenergized and as a result the electromagnet core 63 is moved downwardly by the action of the spring 31 acting through lever 29 on valve stem portion 59. This downward movement of the core 63 results in the core being moved into engagement with the armature 68. As soon as the thermostat is moved back to its original position in which it was calling for heat the motor 81 is again reenergized so that the upper portion 59 of the valve stem is free to move upwardly. If the pilot burner is properly lighted then the entire valve stem 15 is moved up opening the valve 14. If, on the other hand, an attempt is made to open the valve 14 by changing the adjustment of the thermostat, without first lighting the pilot, the movement of core 63 into engagement with the armature 68 and the return movement of core 63 upwardly does not disturb the position of the valve 14 in any way, the valve being closed during the entire time. Thus unlike certain safety pilot valves of the prior art in which a thermocouple energized electromagnet was employed, it is possible after the release of the elements of the electromagnet to move these elements together again without disturbing the position of the valve. In certain of these prior devices the practice was to move the element attached to the valve to reset the device so that in the event the pilot burner was not lighted the valve was opened during the entire period in which an attempt was being made to reset the valve. In the present device it is possible, as previously explained, to reset the mechanism without disturbing the position of the valve unless the electromagnet is energized by reason of the pilot burner being ignited.

One of the further advantages of the present system is that it can be safely operated even in the event of a current failure. While many electrically operated condition controlling devices have provision for manually actuating the devices to a condition increasing position in the event of a power failure, no provision is usually made for protecting against the condition assuming undesirable values if the power failure continues. The present apparatus is so designed that even when under manual control the various safety controls are all effective.

Let it be assumed that there is a failure of the power supply. By manually grasping lever 29 it can be moved in a clockwise direction. When the lever 29 is moved to a position substantially corresponding to valve open position the pin 102 may be moved under the lever 29. As previously explained this inward movement of pin 102 causes switch blades 100 and 101 to be moved into contact making engagement with each other. As previously explained, the switch blades 100 and 101 function as a recycling switch. Thus as soon as power is restored, a circuit is established to the motor field winding independent of the thermostat 87 as follows: From the left hand terminal of secondary 109 through conductors 155 and 167, switch blade 101, switch blade 100, conductors 168 and 158, field winding 83, and conductor 159 to the other terminal of secondary 109. The energization resulting from the establishment of this circuit causes the motor 81 to move in a direction to cause rotation of gear 35 in a clockwise direction. The pin 102 is so positioned that it retains the lever 29 in a position which does not quite correspond to fully open position. Accordingly the gear 35 is able to move lever 29 slightly further towards its valve open position. As soon as this takes place the pressure of lever 129 on pin 102 is released and this pin is returned to the position shown in Figure 3 by any suitable biasing means. The returning of pin 102 to its original position causes a separation of switch blades 100 and 101. This breaks the previously traced recycling circuit so that the motor is again under the sole control of the thermostat 87. Thus it will be seen that as soon as power returns, the valve is returned to automatic control.

However, as previously pointed out, even if the power failure is prolonged so as to unduly delay the return of the valve to the automatic control of the room thermostat, the valve is at all times under control of the various safety devices. Thus regardless of whether the valve is maintained in open position by reason of the energization of the motor 81 or by the pin 102, the mechanism 37 is free to move the valve 14 towards closed position as the temperature of the boiler water increases. Moreover, if at any time during the operation under power failure conditions, the pilot should become extinguished, the valve will move to closed position. Unlike many similar devices, the action of the safety pilot is not dependent upon the continuance of a power.

It will be readily seen that I have devised a control system employing a valve mechanism actuated in accordance with a plurality of conditions including the temperature of a medium heated by the burner control body valve, in which an increase in the temperature of the medium is effective to cause the valve to be gradually throttled to minimum closed position and thereafter to be moved with a snap action to a full closed position. It will further be seen I have provided an extremely effective and dependable method of insuring valve closure in the event of failure of the pilot burner. It will further be seen that I have accomplished the various objects of the invention through the use of highly effective and relatively simple mechanism.

While I have shown a specific embodiment of my invention for purposes of illustration, it is to be understood that I am limited only by the scope of the appended claims.

I claim as my invention:

1. In combination, a condition controlling device, an operating member connected to said device, a plurality of independent actuators operatively connected to said member to position the same, each of said actuators comprising a device responsive to a different condition, said member comprising two portions with a breakable connection therebetween, one of said portions being connected to said plurality of actuators and the other of said portions being connected to said condition controlling device, means operable during the existence of a predetermined third condition to hold said two portions together so as to cause said device to be positioned by said actuator, and means operable upon said connection being broken as the result of the termination of said predetermined condition to separate said portions to move said controlling device to a definite predetermined position.

2. In combination, a condition controlling device, an operating member connected to said device, a plurality of independent actuators operatively connected to said member to position the same, each of said actuators comprising a device responsive to a different condition, said member comprising two portions with means including an electromagnet for holding said two portions together, one of said portions being connected to said plurality of actuators and the other of said portions being connected to said condition controlling device, means responsive to a third condition controlling the energization of said magnet, and means operative upon deenergization of said magnet to move said controlling device to a predetermined controlling position regardless of the values of the other controlling conditions.

3. In combination, a condition controlling member, means biasing said controlling member to one extreme position, further biasing means biasing said controlling member to a second extreme position and of greater force so as to overcome when effective said first biasing means, first actuating means including a device responsive to a first condition for rendering said further biasing means ineffective when the value of said first condition is such that it is desirable to have said controlling member moved in the direction of the first extreme position, means including a device responsive to a second condition for opposing the action of said first biasing means to limit the movement of said controlling member by said first biasing means in accordance with the value of said second condition, connecting means between said further biasing means and said condition controlling member having two separable portions biased apart and means responsive to a third condition for holding said portions together so long as said third condition exists.

4. In combination, a condition controlling member, means biasing said controlling member to one extreme position, further biasing means biasing said controlling member to a second extreme position and of greater force so as to overcome when effective said first biasing means, first actuating means including a device responsive to a first condition for rendering said further biasing means ineffective when the value of said first condition is such that it is desirable to have said controlling member moved in the direction of the first extreme position, means including a device responsive to a second condition for opposing the action of said first biasing means to limit the movement of said controlling member by said first biasing means in accordance with the value of said second condition, connecting means between said further biasing means and said condition controlling member having two separable portions biased apart, an armature and an electromagnet for holding said portions together as long as said electromagnet is energized, and means responsive to a third condition for controlling the energization of said electromagnet.

5. In combination, a condition controlling member, means biasing said controlling member to one extreme position, further biasing means biasing said controlling member to a second extreme position and of greater force so as to overcome when effective said first biasing means, first actuating means including a device responsive to a first condition for rendering said further biasing means ineffective when the value of said first condition is such that it is desirable to have said controlling member moved in the direction of the first extreme position, means including a device responsive to a second condition for opposing the action of said first biasing means to limit the movement of said controlling member by said first biasing means in accordance with the value of said second condition, connecting means between said further biasing means and said condition controlling member having two separable portions biased apart, an armature and an electromagnet for holding said portions together as long as said electromagnet is energized, and a thermo-couple energizing said electromagnet.

6. In a system for the control of the temperature of a space, a main fluid fuel burner, a pilot burner, a valve controlling the flow of fuel to said main burner, a first biasing means biasing said valve to open position, a valve stem secured to said valve, a member abutting said stem, a second biasing means of greater strength than said first biasing means acting on said member to cause said valve to be moved to closed position, actuating means controlled by a device responsive to the temperature of the space operative upon said temperature falling below a predetermined value to move said member in a direction opposite to that in which it is biased to permit said first biasing means to move said valve towards open position, means responsive to the condition of a fluid heated by said burner operative to variably limit said movement of the valve towards open position in accordance with the value of the said condition, said valve stem comprising two portions, a third biasing means of greater force than said first biasing means urging said portions apart, and means operative when said pilot burner is ignited to maintain said portions together.

7. In a temperature control system, a fluid fuel burner, a pilot burner, a valve controlling the flow of fuel to said burner, actuating means for said valve including a controlling device responsive to a first controlling condition and operative upon said condition assuming a value indicative of a demand for heat to move yieldably said valve towards open position, means responsive to a second controlling condition to variably limit the opening of said valve in accordance with the value of said second condition, a valve stem secured to said valve and acting to transmit the forces exerted by both said actuating means and said means responsive to the second controlling condition to the valve, said valve stem comprising two portions, means biasing said portions apart, and means operative when said pilot burner is ignited to maintain said portions together against said biasing means.

8. In a temperature control system, a fluid fuel burner, a pilot burner, a valve controlling the flow of fuel to said burner, actuating means for said valve including a controlling device responsive to a first controlling condition and operative upon said condition assuming a value indicative of a demand for heat to move yieldably said valve towards open position, means responsive to a second controlling condition to variably limit the opening of said valve in accordance with the value of said second condition, a valve stem secured to said valve and acting to transmit the forces exerted by both said actuating means and said means responsive to the second controlling condition to the valve, said valve stem comprising two portions, means biasing said portions apart, means operative when said pilot burner is ignited to maintain said portions together against said biasing means, said last named means comprising an armature, an electromagnet, and means responsive to the presence or absence of the pilot flame controlling the energization of said electromagnet.

9. In a temperature control system, a fluid fuel burner, a pilot burner, a valve controlling the flow of fuel to said burner, actuating means for said valve including a controlling device responsive to a first controlling condition and operative upon said condition assuming a value indicative of a demand for heat to move yieldably said valve towards open position, means responsive to a second controlling condition to variably limit the opening of said valve in accordance with the value of said second condition, a valve stem secured to said valve and acting to transmit the forces exerted by both said actuating means and said means responsive to the second controlling condition to the valve, said valve stem comprising two portions, means biasing said portions apart, means operative when said pilot burner is ignited to maintain said portions together against said biasing means, said last named means comprising an armature, an electromagnet, and a thermo-couple having its hot junction located in the pilot flame and adapted to energize said electromagnet.

10. In a temperature control system, a fluid fuel burner, a valve controlling the flow of fuel to said burner, actuating means for said valve including a controlling device responsive to a first controlling condition and operative upon said condition assuming a value indicative of a demand for heat to move yieldably said valve towards open position, further actuating means for said valve including a device responsive to a second controlling condition, and connecting means between said further actuating means and said valve independent of said previously named actuating means and operative upon continued movement of said further actuating means in valve closing direction to move said valve gradually towards closed position until said valve reaches a predetermined minimum closed position and to then move said valve suddenly to closed position with a snap action.

11. In a temperature control system, a fluid fuel burner, a valve controlling the flow of fuel to said burner, actuating means for said valve including a controlling device responsive to a first controlling condition and operative upon said condition assuming a value indicative of a demand for heat to move yieldably said valve towards open position, further actuating means for said valve including a device responsive to a second controlling condition, and connecting means between said further actuating means and said valve independent of said previously named actuating means and operative upon continued movement of said further actuating means in valve closing direction to move said valve gradually towards closed position until said valve reaches a predetermined minimum closed position and to then move said valve suddenly to closed position with a snap action, said connecting means being operative upon return movement of said actuating means in valve opening direction to cause said valve to move suddenly to a minimum open position and thereafter to cause said valve to move to a variable position determined by the value of said second controlling condition.

12. A control mechanism for a burner comprising, in combination, a burner control device, biasing means acting on said device and effective to bias it to a predetermined position, holding means for retaining it in a second position, said holding means comprising an electromagnet unit, an armature unit, and a thermo-couple adapted to be exposed to a burner flame for controlling the energization of said electromagnet, means connecting one of said units to said control device, and reciprocable actuating means connected to the other of said units whereby when said actuating means is reciprocated to and from a position in which said units are in electromagnetic engagement, said control device is moved from said predetermined position only in the event of said electromagnet being energized by said thermo-couple.

13. A control mechanism for a burner comprising, in combination, a valve adapted to control the flow of fuel to a burner, means biasing said valve to closed position, holding means for retaining it in open position, said holding means comprising an electromagnet unit, an armature unit, and a thermo-couple adapted to be exposed to a burner flame for controlling the energization of said electromagnet, means connecting one of said units to said valve, and reciprocable actuating means connected to the other of said units whereby when said actuating means is reciprocated to and from a position in which said units are in electromagnetic engagement, said valve is moved from closed position only in the event of said electromagnet being energized by said thermo-couple.

14. In a burner control system, a valve controlling the flow of fuel to the burner, means biasing said valve to closed position, holding means for retaining it in open position, said holding means comprising an electromagnet unit, an armature unit, and a thermo-couple exposed to a burner flame for controlling the energization of said electromagnet, means connecting one of said units to said valve, reciprocable actuating means connected to the other of said units whereby when said actuating means is reciprocated to and from a position in which said units are in electromagnetic engagement, said valve is moved from closed position only in the event of said electromagnet being energized by said thermo-couple, and means for operating said actuating means at a point remote from said burner.

15. A safety device for a fuel supply line including a valve body, a valve seat therein, a valve engageable with said seat, an armature connected to said valve, magnetic means reciprocably mounted with respect to said armature, primary spring means normally urging said magnetic means away from said seat, secondary spring means biased between said magnetic means and said armature and normally urging said valve into engagement with said seat, energizing means for said magnetic means capable of holding said armature in attracted position thereon but incapable of moving said armature from valve closed position into attracted position against the pressure of said secondary spring means, and resetting means adapted to be manually controlled for moving said magnetic means into engagement with said armature against the pressure of said primary spring means whereby said valve is moved to open position upon release of said resetting means when said magnetic means is energized at the time of release of said resetting means.

16. A control valve comprising a valve body having an inlet, an outlet, and an intermediate valve opening having a valve seat, a movable electromagnet comprising a magnet frame and a coil for energizing said magnet frame, a unitary armature and valve member means engageable with said seat to close communication between said inlet and said outlet and having movement relative said electromagnet, means for separating said unitary armature and valve member means from said electromagnet and for moving same into engagement with said valve seat upon deenergization of said electromagnet, resetting means for moving said electromagnet to position to engage the magnet frame with the armature portion of said unitary armature and valve member means, and spring means for retracting said electromagnet away from said seat and operable to move the armature and valve member means therewith to open the valve when said electromagnet is energized.

17. In combination, a valve body having an inlet, an outlet, and an intermediate valve opening having a valve seat, a movable electromagnet comprising a magnet frame and a coil for energizing said magnet frame, a unitary armature and valve member means engageable with said seat to close communication between said inlet and said outlet and having movement relative to said electromagnet, means for separating said unitary armature and valve member means from said electromagnet and moving same into engagement with said valve seat upon deenergization of said electromagnet, resetting means for moving said electromagnet to position to engage the magnet frame with the armature portion of said unitary armature and valve member means, and means for retracting the electromagnet away from said seat and operable to move the armature and valve member means therewith to open the valve when said electromagnet is energized.

18. A control mechanism for a burner, comprising, in combination, a burner control device, biasing means acting on said device and effective to bias it to a predetermined position, holding means for retaining it in a second position, said holding means comprising an electromagnet, an armature, and a thermo-couple adapted to be exposed to a burner flame for controlling the energization of said electromagnet, means connecting said armature to said control device, and reciprocable actuating means connected to said electromagnet whereby when said actuating means is reciprocated to and from a position in which said electromagnet is brought into engagement with said armature, said control device is moved from said predetermined position only in the event of said electromagnet being energized by said thermo-couple.

19. A mechanism of the class described, comprising, in combination, a control device having an active and an inactive position, a movable electromagnet, a thermo-couple connected to said magnet for energizing the same, an armature connected to said control device and having movement relative said electromagnet, means for separating said armature from said electromagnet for moving said control device to its inactive position upon deenergization of said electromagnet, resetting means for moving said electromagnet to position to engage said armature, and spring means for retracting said electromagnet and operable to move said armature and control device to its active position when the electromagnet is energized by said thermo-couple.

FREDERICK S. DENISON.